United States Patent
Kemwal et al.

(10) Patent No.: US 10,280,868 B2
(45) Date of Patent: May 7, 2019

(54) VEHICLE AND METHOD OF CONTROL THEREOF IN START AND STOP CONDITION

(75) Inventors: Ajay Neil Kemwal, Coventry (GB); Adam Keith Leatherland, Coventry (GB); Rob Palin, Coventry (GB); Baptiste Bureau, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 1157 days.

(21) Appl. No.: 14/004,426

(22) PCT Filed: Mar. 14, 2012

(86) PCT No.: PCT/EP2012/054444
§ 371 (c)(1),
(2), (4) Date: Nov. 13, 2013

(87) PCT Pub. No.: WO2012/123485
PCT Pub. Date: Sep. 20, 2012

(65) Prior Publication Data
US 2014/0081562 A1 Mar. 20, 2014

(30) Foreign Application Priority Data
Mar. 15, 2011 (GB) .................................. 1104335.3

(51) Int. Cl.
*B60W 20/00* (2016.01)
*F02D 45/00* (2006.01)
*B60K 28/04* (2006.01)

(52) U.S. Cl.
CPC .............. *F02D 45/00* (2013.01); *B60K 28/04* (2013.01)

(58) Field of Classification Search
CPC ........... F02N 11/0818; F02N 2200/106; Y02T 10/48; F02D 45/00
See application file for complete search history.

(56) References Cited

U.S. PATENT DOCUMENTS 6,358,180 B1 * 3/2002 Kuroda .................... B60K 6/48
477/183
6,504,259 B1 1/2003 Kuroda et al.
(Continued)

FOREIGN PATENT DOCUMENTS

DE  10211466 C1   8/2003
EP  0729858 A1   4/1996
(Continued)

OTHER PUBLICATIONS

International Search Report for International application No. PCT/EP2012/054444 dated Jul. 20, 2012.
(Continued)

*Primary Examiner* — Hai H Huynh
*Assistant Examiner* — Gonzalo Laguarda
(74) *Attorney, Agent, or Firm* — Carlson, Gaskey & Olds (57) ABSTRACT

In one aspect of the invention there is provided a motor vehicle comprising drive means operable to provide motive power to the vehicle, the vehicle operable automatically to switch off and subsequently to restart the drive means during a drivecycle thereby to reduce a value of one or more prescribed operating parameters, wherein the vehicle may be placed in an eco-stop condition by driver-operated brake means in which the vehicle is held stationary and the drive means is off, the vehicle being operable automatically to restart the drive means when the driver signals release of the brake means, the vehicle comprising means for detecting departure of the driver from the vehicle, in the event that departure of the driver is detected when the vehicle is in the eco-stop condition the vehicle being arranged not to restart the drive means when the driver signals release of the brake means.

17 Claims, 3 Drawing Sheets

(56) References Cited

U.S. PATENT DOCUMENTS

| | | | |
|---|---|---|---|
| 6,878,096 B1 | 4/2005 | Winner et al. | |
| 8,825,244 B2 * | 9/2014 | Rieling | B60K 6/365 180/272 |
| 2001/0013701 A1 | 8/2001 | Onoyama et al. | |
| 2001/0042647 A1 * | 11/2001 | Sakamoto | B60K 6/442 180/65.23 |
| 2007/0054773 A1 | 3/2007 | Braun et al. | |
| 2009/0319161 A1 * | 12/2009 | Abendroth | F02N 11/0818 701/112 |
| 2010/0332064 A1 | 12/2010 | Rieling et al. | |
| 2011/0068895 A1 * | 3/2011 | Gee | B60R 25/00 340/5.67 |

FOREIGN PATENT DOCUMENTS

| | | |
|---|---|---|
| EP | 2199595 A1 | 6/2010 |
| JP | 2001097071 A | 4/2001 |
| JP | 2001164957 A | 6/2001 |
| JP | 2007146727 A | 6/2007 |
| JP | 2010116861 A | 5/2010 |
| JP | 2010149634 A | 7/2010 |

OTHER PUBLICATIONS

Combined Search and Evaluation Report under Sections 17 and 18(3) for Application No. GB1104335.3 dated Jul. 15, 2011.

Communication pursuant to Rule 114(2) EPC, Third Party Observation for Application No. 12709090.0 dated Oct. 24, 2017.

Johann Tonhauser, et al., Start-Stopp-Systeme Für Fahrzeuge Mit Automatikgetriebe Neue Hierausforderungen Und Systemweiterentwicklung, Atzelektronik, Dec. 1, 2010, pp. 36-41, XP55475880.

Johann Tonhauser, et al., Start-Stop System for Automatic Vehicles, New Challenges and System Enhancements, Atzelektronik, Dec. 1, 2010, pp. 36-41, XP55475880.

Communication pursuant to Article 94(3) EPC, Application No. 12 709 090.0 dated May 29, 2018.

* cited by examiner

VEHICLE AND METHOD OF CONTROL THEREOF IN START AND STOP CONDITION

FIELD OF THE INVENTION

The present invention relates to a vehicle and to a method of controlling a vehicle. In particular, but not exclusively, the invention relates to a vehicle having stop/start functionality in which an actuator may be automatically stopped and restarted during the course of a drivecycle. By drivecycle is meant a period during which a vehicle is used to undertake a journey, commencing when the driver initiates starting of the vehicle (or 'key on') and ending when the driver initiates shutdown of the vehicle (or 'key off').

BACKGROUND

It is known to provide a motor vehicle having stop/start functionality in which an engine of the vehicle is switched off to save fuel when conditions permit such as when the vehicle is held stationary with a driver-operated brake pedal depressed. The condition in which the vehicle is held stationary with the engine automatically switched off during a drivecycle is known as an 'eco-stop' condition.

When the driver releases the brake pedal the engine may be restarted and a transmission of the vehicle may be re-engaged. That is, under 'no fault' normal operating conditions, release of the brake pedal by the driver triggers the engine to be restarted, the driveline to be closed and torque to be transmitted to the drive wheels.

The problem exists that if the vehicle is in the eco-stop condition the driver may forget that the vehicle is in such a condition, for example due to distraction, and decide to exit the vehicle. When the driver releases the brake pedal in order to exit the vehicle, the vehicle may therefore move forward (or backward) unexpectedly.

A similar problem exists with hybrid electric vehicles (HEVs) having an engine and an electric motor. In a parallel-type HEV the engine may be used to provide motive power to the vehicle. The engine and electric motor may be maintained in a stopped condition when the vehicle is held stationary by the brake pedal (i.e. in the eco-stop condition) in order to reduce fuel consumption.

If the vehicle is operating in a parallel mode in which the engine provides drive torque to the wheels, when the driver releases the brake pedal the vehicle may be arranged to restart the engine and re-engage the transmission. Alternatively, if the vehicle is operating in electric vehicle (EV) mode in which the electric motor is used to drive the vehicle and not the engine, if the vehicle is in the eco-stop condition (in which the electric motor is switched off when the vehicle is stationary) the vehicle may be arranged automatically to restart the electric machine when the brake pedal is released.

It is to be understood that in either case, if the driver has forgotten that the vehicle is in the eco-stop mode the vehicle may move forward unexpectedly when the brake pedal is released.

It is against this background that the present invention has been conceived. Embodiments of the invention may provide a vehicle or a method which addresses one or more of the above issues. Other aims and advantages of the invention will become apparent from the following description, claims and drawings.

SUMMARY

Embodiments of the invention may be understood by reference to the appended claims.

Aspects of the invention provide a motor vehicle and a method.

In another aspect of the invention for which protection is sought there is provided a controller for a motor vehicle comprising drive means operable to provide motive power to the vehicle, the controller being operable automatically to switch off and subsequently to restart the drive means during a drivecycle thereby to reduce an amount of time for which the drive means is on during a given drivecycle, wherein the vehicle may be placed in a so-called eco-stop condition by driver-operated brake means in which the vehicle is held stationary and the drive means is off, the controller being operable automatically to restart the drive means when a driver signals release of the brake means, the controller comprising means for detecting when a driver is departing the vehicle, in the event that it is detected that the driver is departing the vehicle when the vehicle is in the eco-stop condition the controller being arranged not to restart the drive means when the driver signals release of the brake means.

In a further aspect of the invention for which protection is sought there is provided a motor vehicle comprising drive means operable to provide motive power to the vehicle, the vehicle being operable automatically to switch off and subsequently to restart the drive means during a drivecycle thereby to reduce an amount of time for which the drive means is on during a given drivecycle, wherein the vehicle may be placed in an eco-stop condition by driver-operated brake means in which the vehicle is held stationary and the drive means is off, the vehicle being operable automatically to restart the drive means when a driver signals release of the brake means, the vehicle comprising means for detecting when a driver is departing the vehicle, in the event that it is detected that the driver is departing the vehicle when the vehicle is in the eco-stop condition the vehicle being arranged not to restart the drive means when the driver signals release of the brake means.

Embodiments of the invention have the advantage that if the driver forgets that the vehicle is in the eco-stop condition when the vehicle is stationary, and begins to exit the vehicle, the drive means will not re-start when the driver releases the driver-operated brake means. Thus, a risk that the vehicle begins to move unexpectedly is reduced.

It is to be understood for the present purposes that the term 'eco-stop' includes the condition in which the drive means of a hybrid electric vehicle is turned off when the vehicle is stationary, the drive means comprising an engine and one or more electric machines, as well as the condition in which the drive means of a stop/start vehicle (which may consist of an engine only) is turned off when the vehicle is stationary.

In an embodiment the means for detecting that the driver is departing comprises at least one sensor.

In an embodiment the means for detecting that the driver is departing is arranged to detect that the driver is departing responsive to the signal from the at least one sensor when the driver signals release of the brake means.

Thus, when the driver signals release of the brake means and the at least one sensor is in a particular state the vehicle is arranged to determine that the driver is departing the vehicle. The engine is therefore not restarted in order to prevent injury to the driver.

Determination whether or not the driver is signalling release of the brake means may be made by reference to a brake pressure request by the driver, for example by reference to a state of a brake pedal of the vehicle, to an actual brake pressure measurement, or any other suitable means.

Optionally the sensor comprises a driver safety restraint device condition sensor.

Thus the vehicle may comprise a circuit in which when the safety restraint device is released a sensor in the form of a switch changes state (for example from open to closed or closed to open).

The driver safety restraint device advantageously comprises a seat belt device, the vehicle being arranged to detect departure of the driver responsive to the seat belt device being released.

Alternatively or in addition the at least one sensor is arranged to provide a signal responsive to a state of a driver's door, the vehicle being arranged to detect that the driver is departing when the driver's door is opened.

Further alternatively or in addition the at least one sensor is arranged to detect when a mass greater than a prescribed value is present on the driver's seat, the vehicle being arranged to detect that the driver is departing responsive to removal of the mass from the driver's seat.

Alternatively or in addition the at least one sensor may comprise an image sensor arranged to form an image of at least a portion of a driver's body, the vehicle being configured to determine when a driver is departing the vehicle responsive to said image.

For example, the image sensor may comprise a camera. The camera may be arranged to capture an image of a driver's face, for example a digital image. A computing device may be considered to process the image and to detect when the driver is departing the vehicle. For example, the device may be arranged to detect movement corresponding to departure of the driver. In some embodiments the device may be arranged to detect one or more features of a seat of the vehicle visible to the image sensor only when a driver is not sitting in the seat, for example one or more features of a seatback.

In an embodiment the vehicle comprises an automatic transmission having a park mode, in the event that it is detected that the driver is departing the vehicle when the vehicle is in the eco-stop condition the vehicle being arranged to control the transmission to assume the park mode.

It is to be understood that the 'park' mode may be a mode of the transmission in which one or more locking means is applied to lock the transmission and prevent rotation of one or more wheels of the vehicle. For example in some embodiments a locking pin may be deployed to lock the transmission. The locking pin may be comprised by the transmission.

In some arrangements the park mode is a mode in which the transmission is disconnected from the engine. In addition in some embodiments the park mode may be a mode in which the transmission remains connected to the driveline of the vehicle.

Thus in some embodiments if when the vehicle is in the eco-stop condition the driver releases his seat belt device the vehicle is arranged to determine that the driver is departing. The vehicle therefore controls the transmission to assume the park mode when the seat belt device is released.

In some alternative embodiments, if when the vehicle is in the eco-stop condition the driver releases the seat belt device and then releases the driver-operated brake means the vehicle is arranged to determine that the driver is departing, and consequently to control the transmission to assume the park mode when the driver-operated brake means is released.

It is to be understood that in some vehicles a manual transmission (or gearbox) is provided instead of an automatic transmission.

In an embodiment the driver-operated brake means comprises stopping brake means for stopping the vehicle and a parking brake, when the vehicle is held stationary in the eco-stop condition by means of the stopping brake means the vehicle being arranged automatically to apply the parking brake in the event that it is detected that the driver is departing the vehicle.

It is to be understood that the stopping brake means (which may also be referred to as foundation brake means) may be or include brake means operable by means of a foot pedal and arranged safely to stop the vehicle when moving at speed (as opposed to a parking brake which is arranged to hold the vehicle stationary once the vehicle is substantially stationary). Thus if the vehicle is held in the eco-stop condition by means of the stopping brakes (such as disc brakes) the parking brake is automatically applied if it is detected that the driver is departing the vehicle.

Thus reference to parking brake is intended to mean reference to a brake that is not intended by the manufacturer to be used to slow the vehicle to a stop in normal use. However it is to be understood that some forms of electrically actuated parking brakes may be arranged to bring a vehicle to a safe halt, for example in a 'dynamic mode' of the parking brake. Other arrangements are also useful.

Optionally in the event departure of the driver is detected when the vehicle is in the eco-stop condition the driver-operated brake means continues automatically to be applied.

Optionally in the event departure of the driver is detected when the vehicle is in the eco-stop condition the vehicle is further arranged to assume a shutdown mode.

This has the feature that in some embodiments the number of activities the driver is required to complete before he can leave the vehicle is reduced.

The drive means may comprise an electric machine, wherein in the first mode the vehicle may be held in the eco-stop condition by the driver-operated brake means in which the vehicle is stationary and the electric machine is off, the vehicle being operable automatically to restart the electric machine when the driver signals release of the brake means.

In an embodiment the drive means comprises an engine, wherein in the first mode the vehicle may be held in the eco-stop condition by the driver-operated brake means in which the vehicle is stationary and the engine is off, the vehicle being operable automatically to restart the engine when the driver signals release of the brake means.

Optionally the vehicle is a hybrid electric vehicle (HEV) wherein the drive means comprises an engine and an electric machine.

The vehicle may be operable in a parallel HEV mode in which the engine and the electric machine provide motive torque to drive the vehicle in parallel.

Alternatively or in addition the HEV may be operable in a series mode in which the engine generates electric power to drive the electric machine thereby to provide motive torque to drive the vehicle.

In a further aspect of the invention for which protection is sought there is provided a method of controlling a motor vehicle, the method comprising controlling the vehicle automatically to assume an eco-stop condition in which drive means of the vehicle is switched off in order to reduce an amount of time for which the drive means is on during a given drivecycle, the method further comprising holding the vehicle stationary in the eco-stop condition by means of driver operated brake means and controlling the vehicle to perform an eco-start wherein the drive means is restarted when the driver signals release of the driver operated brake means, the method further comprising detecting that a driver is departing the vehicle, in the event it is detected that the driver is departing the vehicle when the vehicle is in the eco-stop condition the method further comprising not restarting the drive means when the driver signals release of the brake means.

Within the scope of this application it is envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
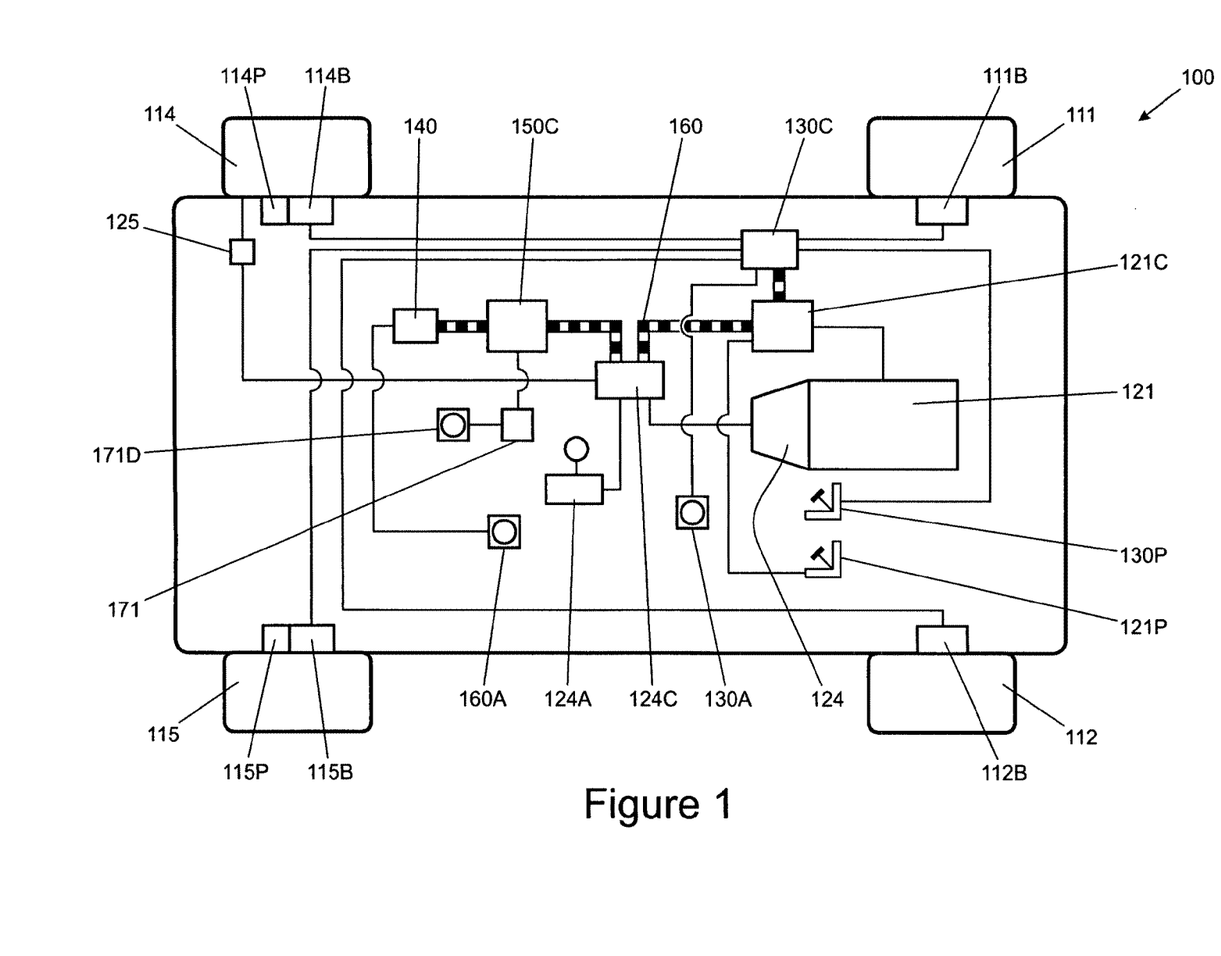
FIG. 1 is a schematic illustration of a stop/start motor vehicle according to an embodiment of the present invention.

FIG. 1 shows a stop/start vehicle 100 according to an embodiment of the invention having an internal combustion engine 121, an automatic transmission 124 and a set of four wheels 111, 112, 114, 115. Each of the wheels has a respective disc brake 111B, 112B, 114B, 115B operable by means of a driver operated brake pedal 130P to decelerate the vehicle when the vehicle is moving. Rear wheels 114, 115 of the vehicle are also provided with a respective driver operated parking brake 114P, 115P each in the form of a drum brake. The parking brakes 114P, 115P are operable to be applied and released by means of a driver-operated parking brake actuator 130A in the form of a push-button actuator.

Figure 2:
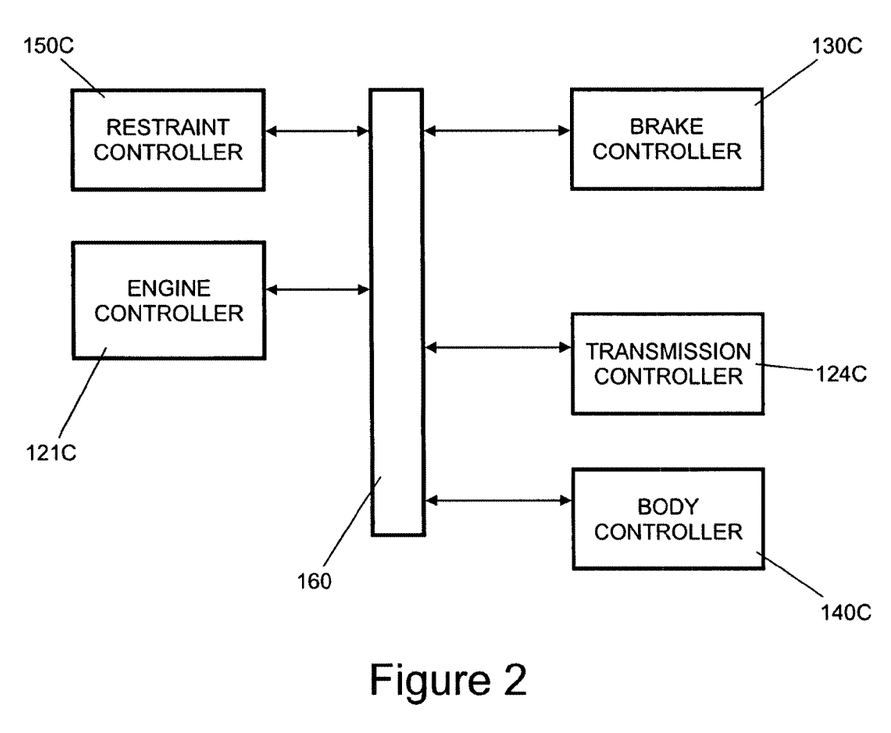
FIG. 2 is a schematic illustration of a control architecture of the vehicle of FIG. 1.

The vehicle 100 has a body controller (BCM) 140C, an engine controller 121C, a brake controller 130C, a transmission controller 124C and a restraint controller 150C. The controllers 140C, 121C, 130C, 124C, 150C are arranged to communicate with one another by means of a controller area network (CAN) bus 160 as illustrated in FIG. 2.

The body controller 140C is arranged to detect the status of a driver's door of the vehicle by means of a door sensor 271D and the state of a bonnet (or hood) of the vehicle 100.

The engine 121 is operable to be started and stopped by means of the engine controller 121C. The engine controller 121 is arranged to implement a stop/start scheduler that determines when the engine 121 should be stopped according to a stop/start control methodology. When it is determined that the engine should be stopped the stop/start scheduler commands the engine controller 121C to stop the engine 121. When it is determined that the engine 121 should be restarted, the stop/start scheduler commands the engine controller 121C to restart the engine 121.

The engine controller 121C is arranged to receive an input from the brake controller 130C. When the engine has been stopped according to a command by the stop/start scheduler, the brake controller 130C is arranged to trigger the stop/start scheduler to restart the engine 121 when the brake pedal 130P is released.

The brake controller 130C is operable to apply the parking brakes or disc brakes according to signals received from the brake pedal 130P and parking brake actuator 130A, respectively.

The transmission controller 124C is operable to control the transmission 124 in order to connect and disconnect the transmission 124 from the engine 121. The controller 124C is also operable to control the transmission 124 to operate according to one of a plurality of modes of operation. A driver operable actuator 124A is coupled to the transmission controller 124C by means of which the driver may select the required mode.

In the embodiment of FIG. 1 the modes are: (1) a park mode in which the transmission 124 is disconnected from the engine 121 and a park mode pin element is controlled to lock the transmission 124 thereby to immobilise the vehicle; (2) a reverse mode in which the transmission 124 is arranged to drive the vehicle in a reverse direction; (3) a neutral mode in which the transmission 124 is disengaged from the engine but the park mode pin element is not engaged; a drive mode in which the transmission 124 is engaged with the engine 121 and is operable automatically to select a required one of eight forward gears of the transmission 124; and a low gear mode in which the transmission 124 is operable automatically to select a first or second gear only.

It is to be understood that other numbers of gears are also useful such as five, six, nine or any other suitable number of gears.

It is to be understood that the transmission controller 124C may control the transmission 124 to assume the park mode when required.

It is to be understood that in some embodiments, when the transmission controller 124C controls the transmission 124 to assume the park mode the vehicle 100 is controlled such that a driver-operable transmission mode selector assumes the park mode in addition to the transmission 124 itself assuming the park mode.

In some embodiments the transmission mode selector is required to be physically moved in order to assume the park mode. In some alternative embodiments the transmission mode selector is not required to physically move. For example the mode selector may be provided in the form of a 'soft key' or a 'soft rotary control' or 'dial'. Since the physical position or state of the selector is not indicative of the selected mode. an electronically-controlled indication of the selected mode is provided to enable driver to determine the selected mode.

The vehicle 100 is also operable to assume a stop/start mode according to the state of a driver-operated actuator 160A. In the stop/start mode the stop/start scheduler is arranged to command the engine 121 to stop under selected conditions in which a fuel saving may be made. The conditions may be selected to be conditions in which the engine 121 may be stopped without unduly compromising performance of the vehicle. In some embodiments the engine 121 is stopped under selected conditions in which an amount of carbon dioxide and/or other undesirable gas emitted by the engine 121 may be reduced.

For example, if the driver holds the vehicle 100 in a stationary condition by means of the brake pedal 130P (which applies the disc brakes 111B-115B as described above), in the stop/start mode the vehicle 100 is arranged to command the stop/start scheduler to switch off the engine 121 thereby to save fuel as described above. This state will be referred to as an 'eco-stop condition'. That is, the vehicle 100 is stationary with the engine 121 stopped automatically according to the stop/start control methodology.

When the driver releases the brake pedal 130P the disc brakes 111B-115B continue to be applied automatically by the vehicle 100 and the engine 121 is restarted. Once the engine 121 has restarted the transmission 124 is connected to the engine 121 to provide torque to the wheels and the disc brakes 111B-115B are released.

In the vehicle 100 of FIG. 1 the restraint controller 150C is configured to detect whether or not the driver's seat belt buckle is fastened to a locking device that secures the seat belt buckle thereby to restrain movement of the driver in the event of an impact. Accordingly the controller 150C is also coupled to a seat buckle state detector 173.

The seat belt buckle state detector 173 is configured to provide a signal to the restraint controller 150C responsive to whether or not the seat belt buckle is fastened to the locking device.

The vehicle 100 is configured to communicate an output of the seat belt buckle state detector 173 to the stop/start scheduler of the engine controller 121 in order to prevent restarting of the engine 121 if the brake pedal 130P is released when the seat belt buckle is unfastened (or 'released') from the locking device.

In the event that the vehicle 100 is in the eco-stop condition and the seat belt buckle state detector 173 indicates the seat belt buckle is unfastened (or 'released') the transmission 124 is controlled to assume the park mode and the vehicle 100 is controlled to assume the shutdown mode.

In the shutdown mode the eco-stop condition is exited so that there is no possibility that the engine will restart without an express command from the driver.

In some alternative embodiments, in the event that the vehicle 100 is in the eco-stop condition and the vehicle 100 determines that the seat belt buckle is unfastened the vehicle determines that the driver is departing the vehicle as soon as the driver releases the brake pedal 130P. Thus the transmission 124 is controlled to assume the park mode and the vehicle 100 is controlled to assume the shutdown mode when the brake pedal 130P is released.

In the shutdown mode the driver can remove a starter key or other starter device from the vehicle 100, exit the vehicle and lock the vehicle.

It is to be understood that embodiments of the invention have the advantage that a risk that the engine 121 is restarted automatically when a driver releases his foot from the brake pedal 130P before, during or after exiting the vehicle 100 is reduced. This reduces a risk of injury to the driver or persons or objects in front of or around the vehicle due to unexpected movement of the vehicle 100.

Furthermore, embodiments of the invention provide a means by which a driver may force a convenient shutdown of a vehicle 100 when he wishes to exit the vehicle 100. This shutdown may be referred to as an 'easy-stop' procedure or a 'lazy-stop' procedure.

In some embodiments the driver can accomplish the easy-stop procedure by unfastening his seat belt buckle once the vehicle 100 is in the eco-stop condition. Upon detecting that the seat belt buckle has been unfastened the vehicle 100 is controlled automatically to place the transmission 124 in the park mode and to perform one or more other steps required in order to assume the shutdown mode.

As noted above, in some embodiments the driver can accomplish the easy-stop procedure by unfastening his seat belt buckle once the vehicle 100 is in the eco-stop condition and subsequently releasing the brake pedal 130P. That is, when the brake pedal 130P is released the vehicle 100 is controlled automatically to place the transmission 124 in the park mode and to perform one or more other steps required in order to assume the shutdown mode.

It is to be understood that embodiments of the present invention are also useful in hybrid electric vehicle (HEV) applications in which actuators of the vehicle are stopped when the vehicle is stationary in order to reduce fuel consumption and/or an amount of one or more gases emitted by the engine. The actuators are typically an engine and at least one electric machine operable as an electric motor.

Figure 3:
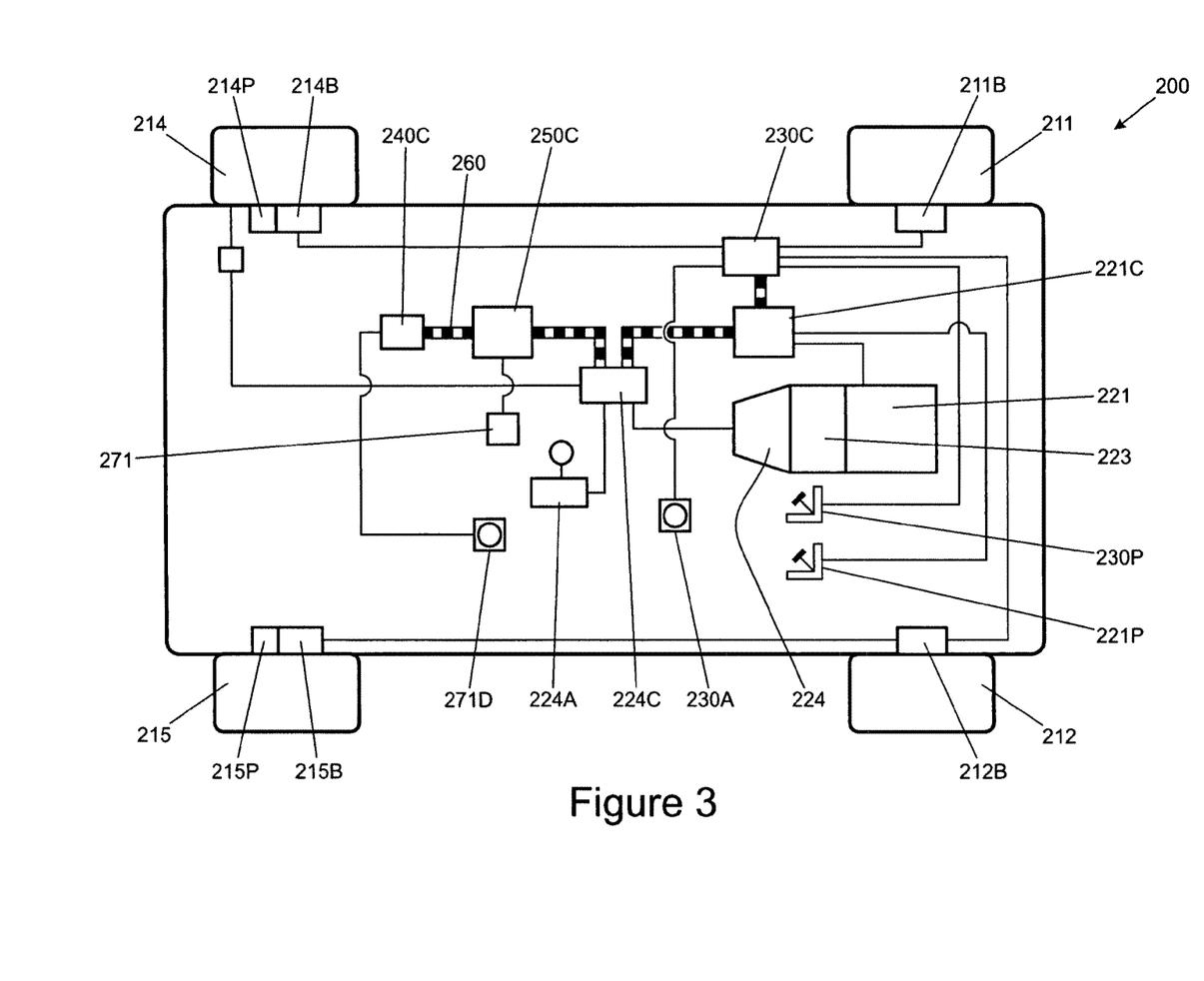
FIG. 3 is a schematic illustration of a hybrid electric vehicle according to an embodiment of the present invention.

FIG. 3 is a schematic illustration of a HEV 200 according to an embodiment of the invention. Like features of the vehicle 200 of FIG. 3 to the vehicle 100 of FIG. 1 are shown with like reference signs prefixed numeral 2 instead of numeral 1.

The vehicle 200 is a parallel HEV having an engine 221 and in addition an electric machine 223. The electric machine 223 is provided between the engine 221 and transmission 224. The engine 221 and electric machine 223 may be decoupled from one another to allow the electric machine 223 to drive the vehicle 200 with the engine 221 switched off.

The vehicle 200 may be operated in a parallel mode in which the engine 221 drives the vehicle 200 or an EV mode in which only the electric machine 223 drives the vehicle 200.

In the parallel mode the electric machine 223 may be operable as a motor to provide further torque to the transmission 124 to drive the vehicle. Alternatively the electric machine 223 may be operable as a generator, thereby placing a torque loading on the engine 221.

When operating in the parallel mode the engine 221 and electric machine 223 may both be stopped when the vehicle 200 is held stationary and in the eco-stop condition by application of the brake pedal 230P. When the pedal 230P is released, the engine 221 may be restarted to drive the vehicle 200.

However if the driver seat belt buckle is released when the vehicle is in the eco-stop condition, the vehicle 200 is arranged such that subsequent release of the brake pedal 230P does not cause the engine 221 to be restarted. Rather, the transmission 224 is controlled to assume the park mode when the seat belt buckle is released. As noted above, in some embodiments the transmission 224 is controlled to assume the park mode when the brake pedal 230P is released after the seat belt buckle has already been released, when the vehicle is in the eco-stop condition.

If the vehicle is operating in the EV mode in which the engine 221 is maintained in the off state, the electric machine 223 may be switched off (i.e. controlled so as not to develop torque to drive the vehicle) when the brake pedal 230P is used to hold the vehicle stationary in the eco-stop condition. It is to be understood that switching off the electric machine 223 reduces an amount of electrical current used by the electric machine whilst the vehicle is stationary.

When the brake pedal 230P is subsequently released the electric machine 223 is restarted to drive the vehicle. However if the driver seat belt buckle is released when the vehicle 200 is in the eco-stop condition, subsequent release of the brake pedal 230P does not cause the electric machine 223 to be restarted. Rather, the transmission 224 is controlled to assume the park mode as described above when the seat belt buckle is released. In some arrangements the transmission 224 is controlled to assume the park mode when the brake pedal 230P is released after the seat belt buckle has been released.

It is to be understood that embodiments of the invention are suitable for use with a wide variety of vehicle types including series-type HEV vehicles and electric vehicles not having a fuel burning engine.

Other arrangements are also useful.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A motor vehicle comprising:
a driver-operated brake comprising at least one of a stopping brake and a parking brake;
an engine or electric motor operable to provide motive power to the vehicle; and
an automatic transmission having a park mode,
the vehicle being operable automatically to switch off and subsequently to restart the engine or electric motor during a drivecycle thereby to reduce an amount of time for which the engine or electric motor is on during a given drivecycle,
wherein the vehicle may be placed in a stop condition by the driver-operated brake in which the vehicle is held stationary and the engine or electric motor is off, the vehicle being operable automatically to restart the engine or electric motor when a driver signals release of the driver-operated brake,
the vehicle comprising means for detecting departure of the driver from the vehicle, in the event that departure of the driver is detected when the vehicle is in the stop condition the vehicle being arranged not to restart the engine or electric motor when the driver signals release of the driver-operated brake and to control the transmission to assume the park mode, and
when the vehicle is held stationary in the stop condition by the stopping brake, the vehicle being arranged automatically to apply the parking brake in the event departure of the driver is detected.

2. A vehicle as claimed in claim 1, wherein the means for detecting departure of the driver comprises at least one sensor.

3. A vehicle as claimed in claim 2, wherein the means for detecting departure of the driver is arranged to detect driver departure responsive to the signal from the at least one sensor when the driver signals release of the driver-operated brake.

4. A vehicle as claimed in claim 2, wherein the sensor comprises a driver safety restraint device condition sensor.

5. A vehicle as claimed in claim 4, wherein the driver safety restraint device comprises a seat belt device, the vehicle being arranged to detect departure of the driver responsive to the seat belt device being released.

6. A vehicle as claimed in claim 2, wherein the at least one sensor is arranged to provide a signal responsive to a state of a driver's door, the vehicle being arranged to detect departure of the driver responsive to the driver's door being opened.

7. A vehicle as claimed in claim 2, wherein the at least one sensor is arranged to detect when a mass greater than a prescribed value is present on the driver's seat, the vehicle being arranged to detect departure of the driver responsive to removal of the mass from the driver's seat.

8. A vehicle as claimed in claim 2, wherein the at least one sensor comprises an image sensor arranged to form an image of at least a portion of a driver's body, the vehicle being operable to determine when a driver is departing the vehicle based upon said image.

9. A vehicle as claimed in claim 1, wherein in the event departure of the driver is detected when the vehicle is in the stop condition the driver-operated brake continues automatically to be applied.

10. A vehicle as claimed in claim 1, wherein in the event departure of the driver is detected when the vehicle is in the stop condition the vehicle is further arranged to assume a shutdown mode.

11. A vehicle as claimed in claim 1, wherein the vehicle is operable automatically to switch off and subsequently to restart the engine or electric motor during a drivecycle in order to reduce a value of one or more operating parameters of the vehicle.

12. A vehicle as claimed in claim 11, wherein the one or more operating parameters of the vehicle are selected from a rate of consumption of a fuel by the engine and an amount of one or more gases emitted by the engine.

13. A vehicle as claimed in claim 11, wherein the one or more operating parameters include an amount of one or more emitted gases including at least one of carbon dioxide, nitrous oxide and sulphur dioxide.

14. A vehicle as claimed in claim 1, wherein the vehicle is a hybrid electric vehicle (HEV) and wherein the engine or electric motor comprises an engine and an electric machine.

15. A vehicle as claimed in claim 14, wherein the vehicle is operable in a parallel HEV mode in which the engine and the electric machine provide motive torque to drive the vehicle in parallel.

16. A vehicle as claimed in claim 14, wherein the vehicle is operable in a series HEV mode in which the engine generates electric power to drive the electric machine thereby to provide motive torque to the vehicle.

17. A method of controlling a motor vehicle, the vehicle comprising a driver-operated brake comprising at least one of a stopping brake and a parking brake, the method comprising:
controlling the vehicle automatically to assume a stop condition in which an engine or electric motor of the vehicle is switched off in order to reduce an amount of time for which the engine or electric motor is switched on during a given drivecycle;
holding the vehicle stationary in the stop condition by the stopping brake;
controlling the vehicle to perform a start wherein the engine or electric motor is restarted when the driver signals release of the stopping brake;
detecting departure of a driver from the vehicle;
in the event driver departure is detected when the vehicle is in the stop condition, not restarting the engine or electric motor when the driver signals release of the stopping brake, controlling an automatic transmission of the vehicle to assume a park mode, and automatically applying the parking brake.

* * * * *